US012528311B2

(12) United States Patent
D'Epenoux et al.

(10) Patent No.: US 12,528,311 B2
(45) Date of Patent: Jan. 20, 2026

(54) PAINT MIXING CONTAINER

(71) Applicant: PPG Industries Ohio, Inc., Cleveland, OH (US)

(72) Inventors: Alban R. D'Epenoux, Morges (CH); Ignasi Roig Ferrer-Dalmau, Rolle (CH)

(73) Assignee: PPG Industries Ohio, Inc., Cleveland, OH (US)

(*) Notice: Subject to any disclaimer, the term of this patent is extended or adjusted under 35 U.S.C. 154(b) by 740 days.

(21) Appl. No.: 17/426,350

(22) PCT Filed: Jan. 23, 2020

(86) PCT No.: PCT/IB2020/050508
§ 371 (c)(1),
(2) Date: Jul. 28, 2021

(87) PCT Pub. No.: WO2020/157608
PCT Pub. Date: Aug. 6, 2020

(65) Prior Publication Data
US 2022/0105745 A1 Apr. 7, 2022

(30) Foreign Application Priority Data
Jan. 31, 2019 (EP) .................................... 19154854

(51) Int. Cl.
*B44D 3/08* (2006.01)
*B44D 3/12* (2006.01)

(52) U.S. Cl.
CPC ............... *B44D 3/08* (2013.01); *B44D 3/127* (2013.01)

(58) Field of Classification Search
CPC ...... B01F 2101/30; A47J 43/046; B44D 3/06; B44D 3/127; B44D 3/08; B05B 7/2408; B65D 47/32
See application file for complete search history.

(56) References Cited

U.S. PATENT DOCUMENTS 2,027,297 A * 1/1936 Tramposch ............ B01F 27/88 366/605
2,501,016 A * 3/1950 Woodman .............. B01F 27/88 366/605
(Continued)

FOREIGN PATENT DOCUMENTS

DE 102009044205 A1 5/2010
EP 1541224 A2 6/2005
(Continued)

OTHER PUBLICATIONS

Office Action cited in European Application No. 19154854.4, mailed on Apr. 13, 2023, 6 pages.
(Continued)

*Primary Examiner* — Elizabeth Insler

(57) ABSTRACT

The present disclosure relates to a container (1) for mixing paint comprising a paint cup (2) comprising a base portion (3) and sidewall portions (4) enclosing a receptacle volume (5), and having an opening (6) opposite to the base portion (3); a rotatable mixing element (17) disposed in the receptacle volume (5); and a coupling means (19) for operatively connecting the rotatable mixing element (17) to an actuator (30) configured to drive the rotatable mixing element (17). A paint mixing apparatus (26) comprising one or more ports (27) configured to accommodate such paint mixing container (1) and comprising an actuator (30) configured to drive the rotatable mixing element (17) and a process for mixing paint making use of such paint mixing container (1) are also disclosed.

18 Claims, 6 Drawing Sheets

(56) References Cited

U.S. PATENT DOCUMENTS

| | | | | |
|---|---|---|---|---|
| 2,603,461 | A | 7/1952 | Marienthal et al. | |
| 3,863,903 | A * | 2/1975 | Brehmer | B05B 15/25 366/279 |
| 4,501,500 | A | 2/1985 | Terrels | |
| 5,094,543 | A | 3/1992 | Mursa | |
| 5,437,385 | A | 8/1995 | Fillon | |
| 9,492,799 | B1 * | 11/2016 | Villaseñor | B01F 27/1122 |
| 2008/0175095 | A1 | 7/2008 | Mott et al. | |
| 2010/0243656 | A1 * | 9/2010 | Nazarian | B67D 7/02 29/428 |
| 2015/0360248 | A1 * | 12/2015 | Camilleri | B05B 7/2472 206/221 |
| 2019/0069725 | A1 * | 3/2019 | Wang | A47J 43/0722 |
| 2019/0240695 | A1 * | 8/2019 | Michals, Jr. | B05C 1/0813 |

FOREIGN PATENT DOCUMENTS

| | | | |
|---|---|---|---|
| WO | 2010108444 | A1 | 9/2010 |
| WO | 2017/029260 | A1 | 2/2017 |

OTHER PUBLICATIONS

Office Action received for European Patent Application No. 19154854.4, mailed on Oct. 9, 2024, 7 pages.

European Search Report and Search Opinion received for European Application No. 19154854.4, mailed on Aug. 9, 2019, 9 pages.

International Preliminary Report on Patentability received for PCT Patent Application PCT/IB2020/050508, mailed on Aug. 12, 2021, 9 pages.

International Search Report and Written Opinion received for PCT Patent Application No. PCT/IB2020/050508, mailed on May 6, 2020, 12 pages.

Office Action received for European Application No. 19154854.4, mailed on May 6, 2021, 7 pages.

* cited by examiner

PAINT MIXING CONTAINER

TECHNICAL FIELD

The present invention relates to a container for mixing paint, particularly for use with a spray gun in any kind of paint operations. It also concerns a paint mixing apparatus and a process for mixing paint making use of the paint mixing container.

BACKGROUND

Paints are frequently mixed from multiple components in order to obtain a desired color or other optical property (e.g. sparkling or other special effect) and/or certain application or curing characteristics. For example, in refinish applications such as in bodyshops for vehicle repair a paint has to be provided, which accurately matches the color and visual appearance of an object such as a vehicle undergoing repair and is subsequently applied to the same. For this purpose, paint mixing containers with cylindrical or conical cup-like shape, often having a volume up to about 1 liter and a removable cap with an outlet that can be coupled to a spray gun to apply the mixed paint to a workpiece to be painted, find wide-spread use. Frequently, the dispensed paint components are mixed or blended manually in the paint mixing cup, typically by using a mixing stick or manual stirrer. Such manual paint mixing however requires valuable working time of the painter and causes wastes and a contamination of the workspace by splashing during mixing and/or drops from the used mixing stick or stirrer. The paint losses and associated contamination upon manual mixing may affect the product quality and/or color accuracy and create an unsightly workspace, which is not attractive to work in or show to potential customers.

In order to avoid the afore-mentioned drawbacks associated with manual paint mixing automatic dispensing machines and mixers have been developed. Such devices are however relatively expensive and typically not affordable to for example small bodyshops. Frequently, shakers of the tumbling mixer type such as for example the Collomix Rotogen 1000 are nowadays employed to mix the paint components dispensed to a paint mixing container. Tumbling mixers contain an oblique drive shaft. The paint components are thus hurled relatively far upwards during mixing such that there is a risk that they may splash from the paint mixing cup, if filled to a high level. In order to avoid such spillage, the paint cup may be closed with a cap. However, there is then the risk that a portion of the paint components sticks to parts of the cap and/or returns only incompletely through a filter frequently integrated into the cap such that the paint components may not be entirely homogenized thereby affecting the properties of the obtained mixture such as its color tone. European patent EP 2 490 819 B1 suggests to equip the paint mixing container with an intermediate lid during mixing of the paint in order to avoid such adverse effects. However, this increases complexity of the construction of the paint mixing container and its use, requiring the painter to replace the intermediate lid by a cap with an outlet that may be coupled to an applicator device such as a spray gun after mixing.

It would therefore be desirable to provide a simple, inexpensive easy-to-use solution that alleviates or avoids at least some of the afore-mentioned problems of the prior art. Thus, the present invention aims in particular to provide inexpensive and easy-to-use means that allow for an efficient homogeneous automatic mixing of paint components without spillage issues and contamination of the workspace and enable straightforward application of the obtained mixture to a substrate to be painted.

SUMMARY OF THE INVENTION

The present invention relates, as a solution to the aforementioned objective, to a container for mixing paint which comprises a paint cup comprising a base portion and sidewall portions enclosing a receptacle volume, and having an opening opposite to the base portion, which may optionally be closed with a lid detachably connectable to the opening of the paint cup. The paint mixing container further comprises a rotatable mixing element disposed in the receptacle volume, and a coupling means for operatively connecting the rotatable mixing element to an actuator configured to drive the rotatable mixing element. The paint mixing container with the integrated mixing means according to the present invention may in particular be disposable being intended as affordable easy-to-use paint mixing solution for the mass market.

The present invention is also drawn to a paint mixing apparatus that comprises one or more ports configured to accommodate such a paint mixing container according to the present invention and an actuator configured to drive the rotatable mixing element.

It also concerns a process for mixing paint comprising providing a paint mixing container according to the present invention, introducing one or more paint components to be mixed into the paint cup in desired amounts, optionally closing the opening of the cup with a matching lid, and mixing the one or more paint components by driving the rotatable mixing element by operation of the actuator. This can for example be carried out in a paint mixing apparatus according to the present invention as set forth above.

The present invention furthermore relates to the use of a paint mixing container and/or paint mixing apparatus according to the present invention as described above, and in more detail below, for providing any kind of paint. It is to be understood that in the context of the present disclosure the term "paint" as used herein refers to any kind of fluid or fluidizable, such as sprayable, material that can be used to paint or coat a substrate. Thus, the term "paint" as used herein encompasses for example paints, varnishes, lacquers and coating compositions for any kind of application. This includes for example industrial, architectural, optical and automotive coatings and paints, including primers, basecoats, and topcoats, for manufacturing as well as refinish purposes, e.g. in bodyshops for vehicle repair. "Paints" according to the present invention can impart color to a substrate such in the case of colored paints or color coats, or be clear such as in case of clearcoats. The "paints" are typically water-borne or solvent-borne liquids although other forms such as powder coatings are also within the scope of the invention.

The paint mixing containers according to the present invention with integrated mixing means enable an efficient, homogenous automatic mixing by an external paint mixing device without spillage or leakage of the paint and contamination of the surrounding workspace. The paint mixing containers according to the present invention are easy to use avoiding contact of the painter with the paint or the generation of auxiliary paint-laden waste items such as manual stirring sticks and thus help to keep the workspace clean and tidy. No additional dedicated means for preventing spillage such as an intermediate lid are needed. The paint mixing containers of the present invention can be produced in an economic manner from low cost materials, such as plastics, complying with the requirements of mass production, and be configured to allow for straightforward use with common applicators such as spray guns, for example in a so-called upside-down configuration, wherein the paint mixture is supplied under the action of gravity from the container to the applicator. After use, the paint mixing containers of the present invention can be disposed with any remaining paint safely enclosed therein.

The present invention will be described in further detail in the following discussing also additional optional aspects, features and benefits.

DETAILED DESCRIPTION

As set forth above, the present invention relates to a container for mixing paint. The container comprises a paint cup, which includes a base portion and sidewall portions enclosing a receptacle volume. The paint cup moreover has an opening opposite to the base portion through which the paint components can be dispensed into the receptacle volume. The precise shape and form of the paint cup is not particularly limited. Preferably, the paint cup has though a rotation symmetrical shape. For example, it may have a cylindrical shape or a truncated conical shape. A truncated conical shape for instance may allow for nesting multiple paint cups within each other, which can be advantageous in terms of space-saving storage and shipping. The paint cup usually rests on its base portion, when it is used to dispense or mix the paint components therein. The base portion may accordingly be configured to provide for a safe standing. For example, the base portion or parts thereof may be configured to form a flat plane at its bottom end. Thus, the base portion may be flat at its bottom surface (i.e. the surface facing the outside of the paint cup, away from the receptacle volume), for example having a circular flat bottom surface. It is also possible that the paint cup comprises a supporting element that protrudes outwards from the base portion that defines together with the sidewall portions the receptacle volume. The protruding element may then provide a platform on which the paint cup may rest. For example, the paint cup can comprise a rim at its bottom, which protrudes down from the base portion. The rim can be continuous or discontinuous and may keep the base portion suspended over ground. The rim may thus surround a recess volume at the bottom of the base portion. The base portion and the sidewall portions of the paint cup are usually relatively thin-walled, for example having a thickness of 0.5 mm or less such as 0.2 mm or less, and may allow for some elastic deformation. Optionally, one or more scale(s) can be provided on the sidewall portions of the paint cup to assist the user in providing defined amounts of certain respective paint components in the receptacle volume. The size and dimensions of the paint cup can vary and may be chosen according to practical needs. Thus, the paint cup typically has a receptacle volume in the range from 0.05 L to 2.0 L, such as from 0.1 L or 0.2 L to 1.0 L, like for example about 0.3 L, 0.5 L, 0.6 L or 0.9 L. Ranges between any of the recited values are likewise covered by the present disclosure. Receptacle volumes below 0.05 L are too small for most practical applications as the amounts of required paint material are usually greater. Receptacle volumes above 2.0 L may have disadvantages in terms of handleability, for example when the paint mixing container shall be coupled to and used with a hand-held applicator such as a spray gun.

The paint cup may be a single part or may comprise multiple part such as in case of a support-liner assembly. For example, the paint cup may comprise an outer support cup with a removably insertable liner of a corresponding shape. For instance, both the support cup and the liner may have a truncated conical shape with a flat circular base portion and sidewall portions extending therefrom to define an interior volume. According to this variant, the liner forms the actual receptacle volume wherein the rotatable mixing element is disposed and the paint is mixed. The receptacle volume can be as indicated above. The liner has slightly smaller dimensions than the support cup such that it can be inserted into the support cup, thereby forming a nested configuration. The support cup serves as a rigid support to contain the liner. The liner may for example have a circumferential flange at its open end, which rests on an upper rim of the support cup in the nested configuration. The support cup may typically be used recurrently as it does not come into contact with the paint components. The liner is on the other hand typically disposable. It can in particular be made of a flexible material, for example an elastic plastic material.

The paint mixing container according to the present invention may optionally comprise a lid that may detachably be connected to the paint cup to close the opening of the paint cup. In being detachable from the paint cup, the lid can be removed from the cup for introducing the paint components into the receptacle volume and the opening of the cup can be closed thereafter for mixing the provided components in order to avoid spillage of the contents of the cup and a contamination from the environment.

Various connection means known per se from the art can be used to realize the detachable connection. For example, the sidewall portions can be provided adjacent to the opening of the paint cup with an external thread, and the lid be provided with an internal thread that matches with the external thread on the paint cup to allow for making a screw connection. As an alternative to screw connections, for example snap fit or pressure lock mechanisms can be used. Typically, a sealant member is used to render the connection leak tight. For example, the lid can comprise a member, which upon installation of the lid on the paint cup acts as a seal, e.g. by elastic deformation.

The shape and size of the lid can vary in a wide range, and is generally adapted to the paint cup whose opening it shall cover. For example, the lid can have a hemispherical, cylindrical or truncated conical base shape or a complex shape comprising portions of such or other kinds of geometry. Its height is typically a fraction of the height of the paint cup such as half or less, or a third or less, of the height of the paint cup. Optionally the lid may comprise an outlet for the paint. The outlet can in particular be configured to allow for coupling to a paint applicator device, such as a spray gun. For example, the lid may comprise a hollow tube segment through which paint can flow or be withdrawn from the closed paint container. The hollow tube segment can for example be disposed in the center of the lid and/or form its top end. Coupling to an applicator device can be made by any suitable means. For example, the applicator device can directly be connected to the outlet of the lid by a suitable connection such as a screw or snap fit connection or an adapter can be used to make a fluid connection between the outlet of the paint cup and the applicator device. The outlet such as the afore-mentioned hollow tube segment can for example comprise a thread at its free end, which allows making a screw connection to an applicator device or appropriate adapter equipped with a matching thread.

The lid may furthermore comprise one or more filter to avoid the undesirable passage of coarse particulate material. Suitable filters comprise for example sieves of an appropriate mesh size. The filter can in particular be made of a plastic material. It can be disposed on the inside of the lid, for example held in a respective groove.

The paint-mixing container according to the present invention is particularly suitable as so-called upside-down paint cup for spray guns. Herein, the paint cup that contains the mixed paint ready for application is closed with a lid having an outlet as described above and is coupled to the spray gun in a configuration wherein the lid with the outlet faces downwards such that the contained paint mixture flows to the inlet of the spray gun by means of gravity. Nevertheless, the scope of the present invention is not limited to such upside-down paint cups, but encompasses also paint mixing containers from which the paint can be delivered to a suitable application device by any means known such as for example by suction, hydraulic means, pneumatic means or transfer to a separate paint reservoir of the application device.

The paint mixing container according to the present invention may optionally further comprise a ventilation mechanism. The ventilation mechanism can be of any kind known per se from the art and may for example comprise a ventilation aperture, which can be closed by a valve. The ventilation mechanism enables a pressure equalization and may prevent generation of a vacuum inside the closed container when withdrawing paint therefrom, which could adversely affect application properties such as spray characteristics. The valve of the ventilation mechanism is typically closed when the paint cup is filled with the paint components and upon mixing of the same for avoiding undesired material leakage and it is opened when applying paint from the container via an applicator device such as a spray gun on a substrate to be coated. The ventilation means can for example be provided in the base portion of the paint cup, such as in the above-mentioned recess surrounded by a rim at the bottom of the base portion. The ventilation mechanism, if present, can be disposed in the center of the base portion or in a peripheral area of the base portion. The latter arrangement can be preferable when a central configuration of the coupling means for driving the rotatable mixing element at the base portion is desired. Alternatively, the ventilation means can for example be provided in the lid of the paint cup, such as for example at a distance from its center. A hollow tube may optionally be connected to the ventilation valve and extend into the receptacle volume of the paint cup. The position and length of the tube may be selected such that it does not interfere with the rotatable mixing means disposed in the receptacle volume and that its free end is above typical fill levels when the container is used in an upside-down orientation. Thus, an efficient pressure equilibration without the risk of paint leakage can be achieved when the container is used in an upside-down configuration.

The paint mixing container according to the present invention further comprises as a characteristic element a rotatable mixing element that is disposed in the receptacle volume. The size and shape of the rotatable mixing element can vary, but is generally chosen such that it fits within the receptacle volume and can be actuated to rotate therein. Various different configurations and geometries of the rotatable mixing element can be used. This includes all kinds of shapes and geometries that are common for mixers and stirrers in the art of paint processing.

For example, the rotatable mixing means may comprise a propeller with one or more mixing blades, such as three or more, four or more, five or more or six or more mixing blades. The mixing blades can each be of the same dimensions and/or shape or of a different shape and/or dimension. They can be symmetrically or asymmetrically arranged around the axis of rotation of the mixing element, preferably being symmetrically arranged. They can be disposed in a plane that is perpendicular to the rotation axis. The mixing blades can be inclined under an angle with respect to the rotation axis or be perpendicular thereto. The mixing blades may be solid or comprise one or more openings. The rotatable mixing element may also have a whisk-type configuration. For example, it may have a disc or ring-shaped element at the free end of a rotatable shaft. One or more arcuate, tortuous or spiral-shaped members may extend from the shaft to the disc or ring-shaped element at the free end of the rotatable shaft. The mixing element may also comprise one or more brackets extending radially at the free end of the shaft to each enclose an opening. The brackets may for example have a rectangular or arch-shaped geometry. The mixing element can be arranged and the mixing blades, mixing members or brackets be dimensioned such that the mixing element does not contact the base portion and/or the sidewall portions when the mixing element is actuated to rotate in the receptacle volume, for example keeping a distance of at least 1 mm from the base portion and/or the sidewall portions of the paint cup. Alternatively, the mixing element can be arranged and the mixing blades, mixing members or brackets be dimensioned such that the mixing element almost contacts (distance below 1 mm) or scrapes (i.e. actually physically contacts) the base portion and/or the sidewall portions when the mixing element is actuated to rotate in the receptacle volume. The rotatable mixing element may thus also be provided with one or more scraping element(s). The scraping elements can be formed by the mixing blades, mixing members or brackets as such or be a separate element disposed for example at the free end of at least one mixing blade or provided in addition to the mixing blades, mixing members or brackets. The scraping element(s) may detach paint components from the base portion and/or sidewalls of the paint cup by mechanical action and thereby enhance homogeneity and formulation accuracy of the resulting paint mixture. In order to avoid blocking of the rotation and/or abrasion from the walls of the paint cup the scraping element(s) can for example be flexible and/or made of an elastic material.

The rotatable mixing element may in particular be disposed in the receptacle volume in an orientation such that it rotates in a plane, which is substantially (i.e. ±5 degrees) parallel to the bottom of the paint container, which supports the paint container on a flat ground. If the paint cup has a rotation symmetrical shape, the rotatable mixing element may in particular be disposed with its center of gravity along the rotation symmetry axis of the paint cup and/or in an orientation such that it rotates around an axis substantially (i.e. ±5 degrees) corresponding to or parallel to the rotation symmetry axis of the paint cup.

The rotatable mixing element can be mounted to the base portion of the paint cup, preferably in the center of the base portion. Alternatively, the rotatable mixing element can be mounted to the lid of the paint cup, preferably in the center of the lid, such that it is disposed in the receptacle volume of the paint cup when the lid is mounted on the paint cup to close the opening of the cup. The rotatable mixing element can be mounted to the base portion or the lid via the coupling means described in more detail below. The mount can be such that the rotatable mixing means is disposed in the receptacle volume adjacent or closely above the base portion of the paint cup so that mixing is possible also at low fill levels. For example, the rotatable mixing means can be arranged in the receptacle volume such that its distance to the base portion is less than 20 mm, or less than 10 mm, or less than 5 mm. In a specific variant, the mount allows for adjusting the position of the rotatable mixing element inside the receptacle volume. Thus, the mount may for example comprise a reversibly extendable spacer element such as a shaft of variable length. Usually, the mount has though fixed dimensions.

As mentioned above, the paint mixing container according to the present invention further comprises a coupling means. The coupling means operatively connect the rotatable mixing element to an actuator configured to drive the rotatable mixing element and may serve to mount the rotatable mixing element to the paint cup in a defined arrangement in the receptacle volume as described previously. The operative connection of the rotatable mixing element to an actuator is typically of a mechanical nature, which enables to transfer the torque of a drive shaft of an actuator via the coupling means to the mixing element to cause it to rotate around its axis of rotation in the receptacle volume, although other types of operative connection and actuation, for example by magnetic forces can in principle also be used. The coupling means is typically connected at one end to the rotatable mixing element and has a coupling portion at the opposite end, which faces the outside of the paint cup or lid and is shaped and configured to be engaged by a matching connecting part of the actuator. The coupling means can for example comprise a shaft. The shaft may at one end be connected to the rotatable mixing element and have a coupling portion at the opposite end shaped and configured to be engaged by a matching connecting part of the actuator. For example, the coupling portion may comprise an end portion of the shaft having a polygonal, e.g. triangular, square or hexagonal, cross-section, which fits into a recess of corresponding shape and dimensions of a coupling sleeve of the actuator. Various other coupling solutions known as such from the art can be employed.

The paint cup or lid of the same may comprise a feedthrough for the coupling means. The feedthrough may serve as a mount or seat of the coupling means on the paint cup or lid. It should be configured such that it complies with the coupling means functionality of operatively connecting the rotatable mixing element to the actuator configured to drive the rotatable mixing element. Thus, it may for example allow for rotation of a coupling means such as a shaft housed in the feedthrough. Furthermore, the feedthrough should be leak tight such that no paint components can inadvertently flow out of the paint mixing container upon use. The paint mixing container of the present invention can therefore further comprise a sealing member such as a rubber gasket for a leak tight operative connection of the rotatable mixing element to the actuator via the coupling means. The sealing member may in particular be comprised by the feedthrough.

The coupling means may be disposed at the base portion of the paint cup, for example mounted to a feedthrough provided in the base portion of the paint cup. The feedthrough may for example be provided in the above-mentioned recess surrounded by a rim at the bottom of the base portion, such as at the center of the base portion. Alternatively, the coupling means can be mounted to the lid, for example by a feedthrough provided in the lid of the paint cup.

The paint mixing containers of the present invention and the afore-mentioned various components thereof are typically disposable. They are thus intended for single use, i.e. preparation of a single paint mixture. Of course, paint mixed in a container according to the present invention can be kept therein and freshly remixed for homogenization prior to application. Once the prepared paint has been substantially consumed or is not needed anymore for later applications, the container of the present invention can be disposed as waste with any remaining amounts of paint safely contained by the container.

The materials of the paint mixing containers of the present invention and the above-mentioned components thereof should be compatible with solventborne and waterborne paint systems and comply with relevant official regulations such as the ATEX Directive of the European Union. Preferably, the paint mixing containers of the present invention and/or components thereof are made of recyclable or biodegradable material(s). Suitable materials include in particular plastic materials such as, without being limited thereto, polyolefins such as polyethylene (for example high density polyethylene or low density polyethylene), polypropylene or copolymers of two or more olefins such as ethylene, propylene and higher alkylenes, polystyrene and copolymers of styrene and other unsaturated monomers such as acrylonitrile butadiene styrene (ABS), polyesters like polyethylene terephthalate, polylactic acid and polyhydroxyalkanoates such as poly-3-hydroxybutyrate, polyhydroxyvalerate and polyhydroxyhexanoate, polycaprolactone, polycarbonates, cellulose esters, halogen-containing polymers such as polyvinylchloride, polyamides or a combination of any of the foregoing. The paint mixing container and the components thereof can be made of a clear or an opaque or colored material. The various components of the paint mixing container can be made of the same material or of different materials and/or have the same physical properties such as color or different ones. The paint mixing containers of the present invention and components thereof can be produced by established industrial processes for producing plastic articles such as by injection molding. The paint mixing containers of the present invention can therefore be provided in an economic manner based on low cost materials and existing production technology complying with the requirements of mass production. They may thus be produced at a cost level that is competitive with paint mixing containers presently available in the market.

The containers of the present invention as described above can be used to mix and provide therein any kind of paint such as paints, varnishes, lacquers and coating compositions, including primers, basecoats, and topcoats, color coats and clear coats, for industrial, architectural, optical and automotive applications, including original manufacturing as well as refinish purposes, e.g. in bodyshops for vehicle repair. The prepared paints may be water-borne or solvent-borne liquids or be provided in another form such as a powder coating composition, and are generally sprayable.

The containers according to the present invention can be configured to be compatible by themselves or with an appropriate adapter with all kinds of available applicator devices such as spray guns, including for instance gravity fed systems, for applying the prepared paint to a substrate to be coated.

The integrated mixing means of the paint mixing container of the present invention allow for an efficient mixing of paint components provided in the paint cup by means of an automatic external apparatus without the need for manual mixing.

As previously mentioned, the present invention thus relates also to a paint mixing apparatus comprising one or more ports configured to accommodate a paint mixing container according to the present invention as described above and comprising an actuator configured to drive the rotatable mixing element. The at least one port may comprise means to retain the container during the mixing operation such as a snap lock, cup holder or alike.

The actuator may in particular comprise an electrical or pneumatic drive. The torque that can be generated by the drive should be sufficient to achieve a proper mixing of the targeted paint materials. Preferably, the drive is configured to allow a user to select and adjust the speed of rotation and/or the duration of the mixing process. For the sake of a safe operation the apparatus can be configured such that the actuator is only operable when a paint container is correctly mounted to the respective port.

The actuator may moreover comprise a connecting part arranged at the portion of the port that faces either the base portion or the opening of the paint cup that may be closed by the lid, depending on where the coupling means are disposed on the paint mixing container. The connecting part of the actuator is configured to releasably engage the coupling means of the paint mixing container and thereby operatively connect the actuator and the rotatable mixing element to rotate the later when the drive is operated. An exemplary configuration of the connecting part has been provided above in the discussion of the coupling means of the paint mixing container.

The actuator may for example comprise a drive shaft. The drive shaft can be driven by the electrical or pneumatic drive to rotate around its long axis and have a connecting part configured to releasably engage the coupling means of the paint mixing container as set forth above at its free end. The drive shaft can be arranged substantially vertical with respect to ground. The term “substantially vertical” means in this context that any deviation, if present, from the ideal perpendicular (90°) arrangement of the long axis of the drive shaft with respect to a flat plane of the ground the paint mixing apparatus rests on is less than 10 degrees, such as less than 5 degrees. Accordingly, an efficient mixing is possible with the paint mixing apparatus of the present invention also in a basically upright orientation of the paint cup. The displacement of the paint material along the sidewalls is therefore significantly less as compared to for example mixing by an external tumbling mixer such that a contamination of the lid and/or contact of the paint components with the filter during mixing and associated adverse effects with respect to formulation accuracy and homogeneity of the mixture may be avoided.

As previously mentioned, a process for mixing paint making use of the paint mixing containers of the present invention is also within the scope of present disclosure. For this purpose, a paint mixing container of the present invention as described above is provided and one or more paint components to be mixed are introduced into the paint cup in desired amounts. A single component may for example be used in case of a preformulated paint, which shall be homogenized prior to use. Typically, the process however involves adding two or more paint components in predetermined amounts or ratios to the paint cup in order to prepare a targeted paint according to a selected formula. After dosing of all required components the opening of the paint cup is preferably closed with a matching lid as described previously. The paint components contained in the paint cup are then mixed by driving the rotatable mixing element by operation of the actuator. This mixing may in particular be carried out automatically by an external paint mixing apparatus as described above to which the paint mixing container is mounted. Typically, an appropriately mixed paint may thus be obtained within a relatively short mixing time in the range of about 10 seconds to 2 minutes such as 20 seconds to 40 seconds. The obtained mixed paint may then be used according to its intended application, for example by feeding it to an application device for performing a paint operation. The feeding may be performed directly from the container according to the present application as it can be connected to the application device as set forth above. Alternatively, the paint can be transferred from the container to any other vessel, reservoir or container of an application device for use in a paint operation.

The present invention will be further illustrated in the following by reference to the appended drawings, wherein.

In the drawings like reference numbers are used to designate corresponding features.

Figure 1:
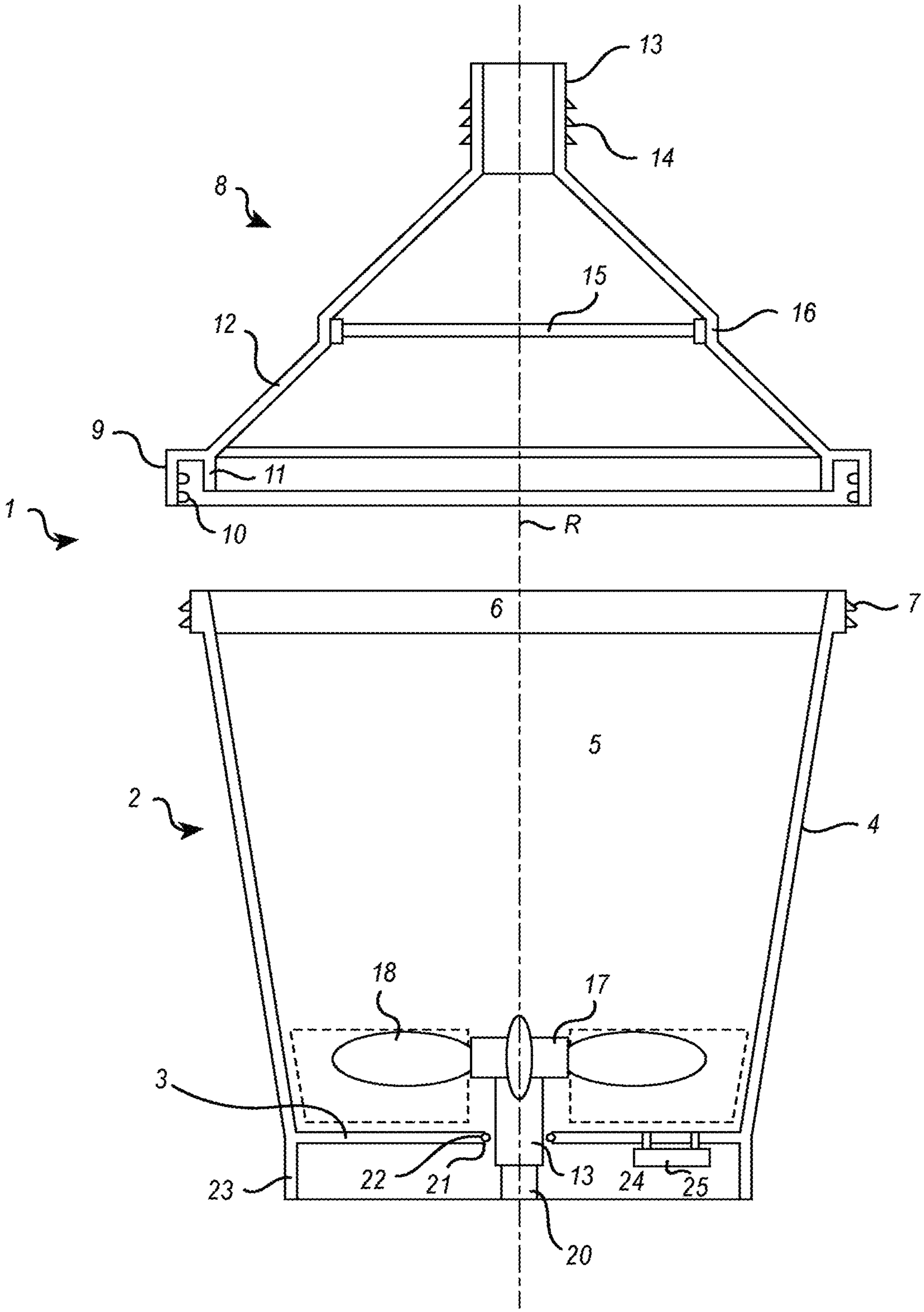
FIG. 1 represents a cross-sectional schematic view of an exemplary embodiment of a paint mixing container according to the present invention having integrated rotatable mixing means mounted to the base portion of a paint cup.

The paint mixing container 1 shown in FIG. 1 comprises a paint cup 2 with a truncated conical shape, which is symmetric with respect to the depicted central rotation axis R. The paint cup 2 has a flat circular base portion 3 and sidewall portions 4 extending therefrom to define a receptacle volume 5 in the interior of the cup 2. The receptacle volume 5 can for example have a volume in the range of 100 mL to 1000 mL, such as about 300 mL, 600 mL or 900 mL. The cup 2 is open at its top, i.e. opposite to the base portion, having a respective opening 6 through which the paint components to be mixed can be introduced into the receptacle volume 5. The sidewall portions 4 are provided with an external thread 7 at their upper end adjacent the opening 6.

The container 1 comprises moreover a lid 8 for closing the opening 6 of the paint cup 2. The lid 8 has for this purpose at its lower end a ring-shaped portion 9, which is provided on its internal surface with a thread 10 that matches the external thread 7 on the upper end of the sidewalls 4 of the cup 2 and can be engaged therewith. At the ring-shaped portion 9 furthermore a sealing lip 11 is formed, which engages with the interior surface of the sidewalls 4 of the cup 2 when the lid 8 is installed thereon to seal it. The lid 8 furthermore comprises a conical wall portion 12, which tapers from the ring-shaped portion 9 to a tubular outlet 13. The tubular outlet 13 may be provided with a thread 14, for example as shown on its external surface, to allow for coupling to a paint application device (not shown), either directly or indirectly via an appropriate adapter. A filter 15, for example in the form of a circular plastic sieve, can be fixed inside the lid 8, for example by being mounted or press fixed to an annular groove or matching receiving portion 16 in the conical wall portion 12. In the embodiment shown in FIG. 1 the lid 8 is likewise symmetric with respect to the central rotation axis R and has a height which corresponds to about half of the height of the paint cup 2.

The paint mixing container 1 furthermore contains a rotatable propeller-type mixing element 17, which is disposed in the receptacle volume 5 of the paint cup 2. The rotatable mixing element 17 has a plurality of (in the depicted example four) mixing blades 18, which extend radially from its center and are arranged symmetrically with a constant angle between each pair of adjacent blades. The mixing element 17 is mounted in the lower part of the paint cup 2, close to the base portion 3, in an orientation such that it rotates upon operation around the axis R. The rotatable mixing element is thus in a centrosymmetric arrangement with respect to the rotation symmetry axis R of the paint cup 2 and the lid 8. The mixing blades 18 herein rotate in a plane that is substantially perpendicular to the axis R. The mixing blades can each individually be oriented perpendicular (as depicted) or be inclined under an angle with respect to their rotational direction. Various different shapes, sizes and geometries of the rotatable mixing element can be used. For example, the mixing blades can have a spoon-like or oval shape and be spaced from the sidewalls 4 and the base portion 3 of the paint cup 2 as depicted in FIG. 1. The mixing blades may however also have another form such as for example a trapezoidal shape and/or be dimensioned such that they (almost) reach to or actually contact the adjacent sidewalls 4 and/or the base portion 3, as indicated by the dashed lines in FIG. 1. In such configuration the mixing blades may also act as scraping elements helping to avoid deposits that stick to the sidewall portions 4 or the base portion 4, respectively. As described beforehand, scraping elements may also be provided as separate components attached to the rotatable mixing element 17.

In the embodiment shown in FIG. 1 the rotatable mixing element 17 is mounted to the base portion 3 of the paint cup 2 by means of coupling means 19. The coupling means 19 comprises a rotary shaft, which is at its upper end connected to the rotatable mixing element 17 and has a coupling portion 20 at its opposite end. The rotary shaft extends with its long axis oriented along the axis R through a feedthrough 21 disposed in the center of the base portion 3. The feedthrough 21 serves as a mount for the coupling means 19 and comprises an annular sealing member 22 for a leak tight connection between the base portion 3 of the cup 2 and the coupling means 19 enabling rotation of the shaft by an external actuator without leakage of fluid material from the paint cup 2. The sealing member 22 can comprise a rubber gasket that can be affixed to the base portion 3, as part of the feedthrough 21, mechanically for example by clamping means or a groove or by an adhesive. The coupling portion 20 of the coupling means 19 is located outside of the paint cup 2. It is shaped and configured to be engaged by a matching connecting part of an actuator 30 configured to drive the rotatable mixing element 17 (cf. also FIG. 2). In the depicted embodiment the coupling portion 20 has a polygonal (e.g. square) cross-section which fits into a recess of matching shape and dimensions of a connecting sleeve 32 at the end of the drive shaft of an external actuator 30. The rotatable mixing element 17 is thus operatively connected to the actuator 30 via the coupling means 19 and may be actuated to rotate around rotation axis R when operating the external actuator 30.

The paint cup shown in FIG. 1 has a ring-shaped support 23 formed at the bottom of the base portion 3 to provide a stand by which the cup may rest on a ground. The ring-shaped support 23 may suspend the base portion 3 of the cup 2 at a distance above the ground and thereby form a recess 24 at the bottom of the cup 2. The coupling means 19 extending through the feedthrough 21 can be situated within the recess 24. The paint mixing container 1 shown in FIG. 1 comprises further a ventilation valve 25 disposed at a peripheral portion of the base portion within the recess 24. The ventilation valve 25 is typically closed when the paint mixing container is in its upright position resting with its ring-shaped support 23 on a ground, for example for adding paint components to the cup 2 or mixing the same, and is opened when using the container 1 in an upside-down orientation (i.e. with the base portion facing upward and the lid with the outlet at the bottom) to feed paint under the action of gravity to an applicator system such as a spray gun coupled to the outlet 13.

Figure 2:
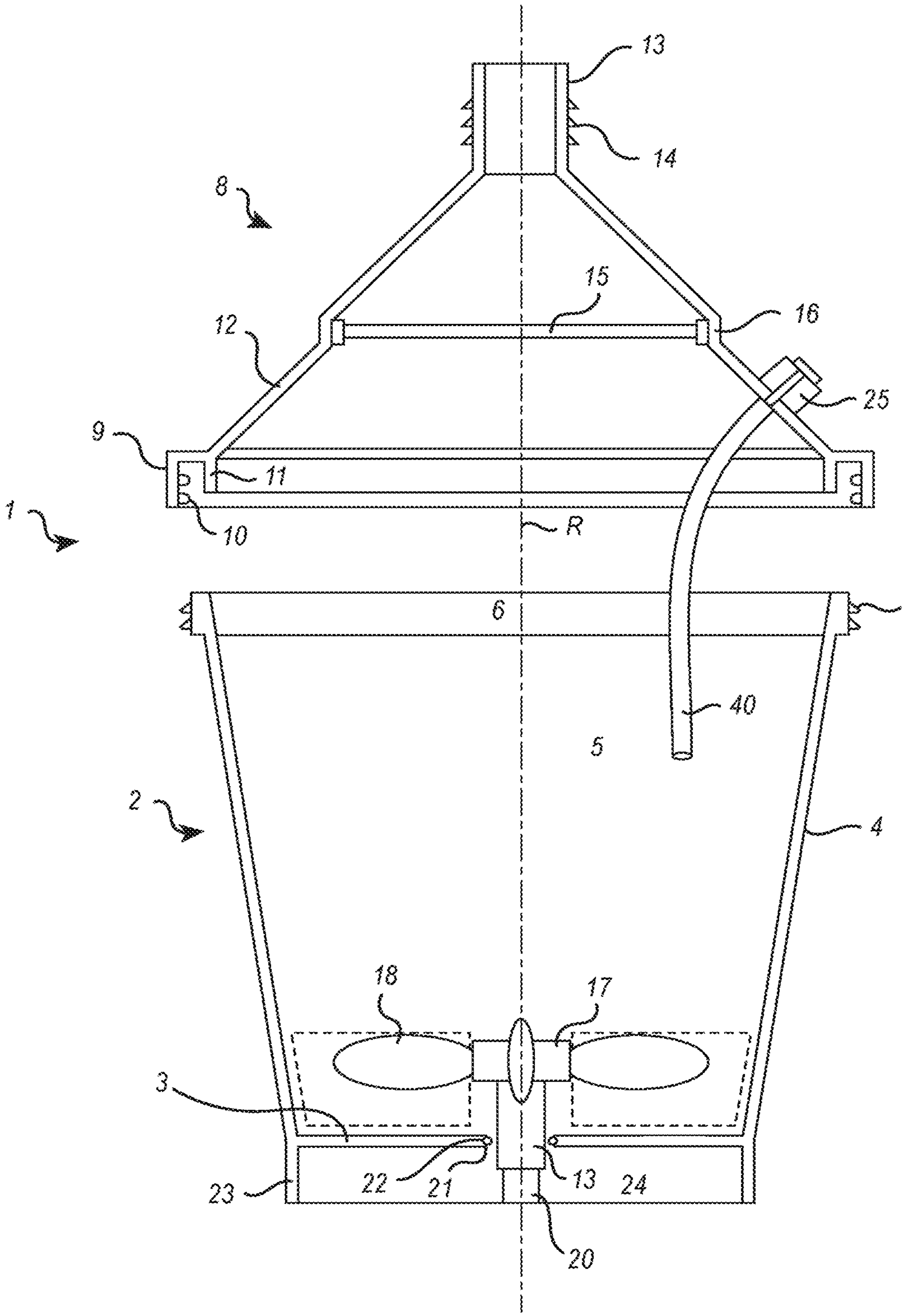
FIG. 2 represents a cross-sectional schematic view of a variant to the paint mixing container according to FIG. 1 having a snap lid with ventilation means.

FIG. 2 shows a variant to the paint mixing container according to FIG. 1. In this variant the lid 8 is configured as a snap fit lid rather than as a threaded lid as shown in FIG. 1. The snap fit lid 8 can be removably installed to close the opening 6 of the paint cup 2 by pressing its ring-shaped portion 9 onto the matching rim formed by the upper end of the sidewalls 4 of the cup 2. The ring-shaped portion 9 is typically somewhat elastic such that it can engage the matching rim formed by the upper end of the sidewalls 4 of the cup 2 when force is applied to form a tight connection. Herein, the ring-shaped portion 9 may have a substantially U-shaped cross-section with an outer leg 36 and an inner leg 11 connected by a middle leg 37. The outer leg 36 and the inner leg 11 contact the outer surface or the interior surface of the rim formed by the upper end of the sidewalls 4 of the cup 2, respectively, when the lid 8 is installed to seal the paint cup 2. The outer leg 36 can have a retention element 38, for example a protrusion or bend portion, to retain the lid in its installed position by grasping the rim formed by the upper end of the sidewalls 4 of the cup 2. The lid 8 furthermore has a tab 39 formed at the ring-shaped portion 9 to extend radially outward therefrom. The tab 39 facilitates removing the lid 8 again from the paint cup 2 by pulling the lid 8 via the tab 39 upwards away from the cup 2.

In the embodiment shown in FIG. 2, the ventilation valve 25 is moreover provided on the lid 8 rather than at the base portion 3 of the paint cup 2. A hollow tube 40 may be connected to the valve 25 and extend into the receptacle volume 5 of the paint cup 2. The position and length of the tube 40 is selected such that the tube does not interfere with the rotatable mixing means 17 and that its free end is above typical fill levels when the container is used in an upside-down orientation. Thus, an efficient pressure equilibration without the risk of paint leakage can be achieved when the paint container 1 is used in an upside-down configuration.

Figure 3:
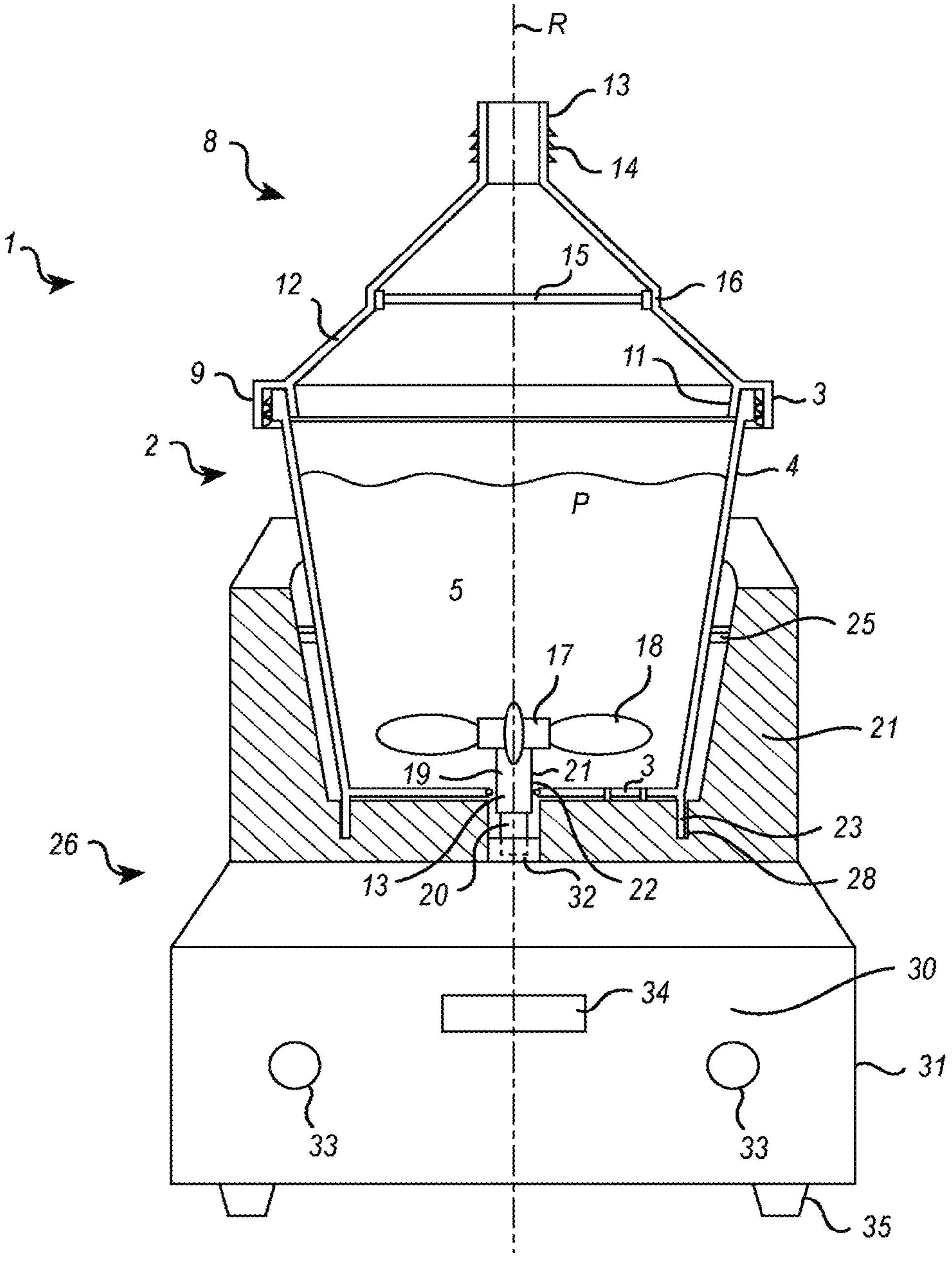
FIG. 3 illustrates a paint mixing apparatus in accordance with the present invention with a paint mixing container as depicted in FIG. 1 mounted thereto, wherein the container and the portion of the apparatus receiving and coupling to the container are shown in cross-section.

FIG. 3 illustrates a paint mixing container 1 according to FIG. 1 as discussed above with paint components P provided in the receptacle volume 5 and lid 8 installed to close the opening 6 of the cup mounted to an exemplary paint mixing apparatus 26 according to the present invention. The paint mixing apparatus 26 comprises a port 27 to accommodate the paint mixing container 1. The port 27 can in particular have a basically complementary shape to the container 1 or a portion thereof to form a seat to which the container may be introduced for example from the top. For the sake of a clearer illustration the container and the portions of the apparatus 26 that receive and couple to the container are shown in cross-section in FIG. 3. As depicted, the port may be configured such that the container when properly installed rests in a basically upright orientation. The port may comprise an annular groove 28, which matches with the ring-shaped support 23 such that the latter fits inside the groove 28. The port 27 may optionally comprise further means to fix or retain the container during the mixing operation. For example, resilient or spring biased retention elements 29 can be provided on the port structure, e.g. laterally on the inside thereof, to exert a holding force on the container installed in the port 27.

The paint mixing apparatus 26 furthermore comprises an actuator 30 configured to drive the rotatable mixing element. The actuator 30 may in particular comprise an electrical or pneumatic drive or motor disposed in a housing 31. A drive shaft which is oriented with its long axis along the axis R is connected to the drive. At the free end of the drive shaft the actuator 30 comprises a connecting part 32 having a shape and dimensions configured to releasably engage the coupling portion 20 of the coupling means of the container 1 as described above. In the depicted configuration the connecting part 32 is disposed at the bottom of the port 27 to operatively couple the actuator 30 to the rotatable mixing element 17 inside the paint cup 2 via the coupling means 19 which extend through the feedthrough 21 at the base portion of the paint cup 2. Operation of the actuator 30 thus rotates the drive shaft, which by means of the afore-mentioned coupling ultimately drives the rotatable mixing element 17 disposed in the receptacle volume 5 of the container 1 around rotational axis R to thereby mix the contained paint components P. The paint mixing apparatus 26 may comprise control means 33 such as adjustment knobs to set the rotational speed and the duration of the mixing process. A display 34 can be provided on the housing 31 to provide status information and/or to facilitate user interaction. Support feet 35 for example made of a vibration-dampening material can be provided at the bottom of the apparatus 26. The paint mixing apparatus 26 may likewise be used with a paint mixing container as depicted in FIG. 2.

Figure 4:
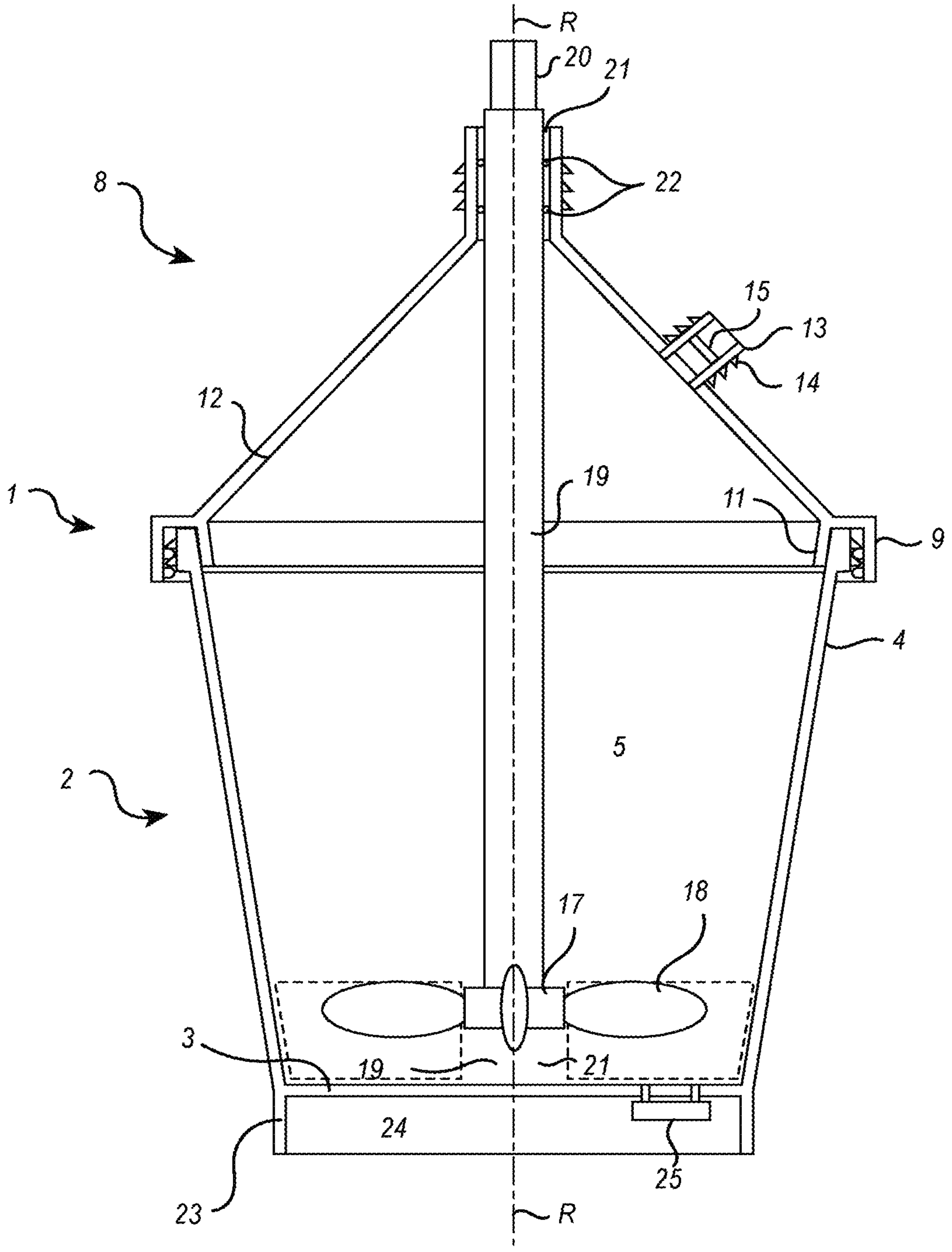
FIG. 4 represents a cross-sectional schematic view of another exemplary embodiment of a paint mixing container according to the present invention with rotatable mixing means mounted to the lid of the paint cup.

FIG. 4 shows a cross-sectional view of another exemplary paint mixing container 1 in accordance with the present invention, with the lid 8 in installed position on the cup 2. The embodiment shown in FIG. 4 corresponds to the container described above with reference to FIG. 1, however, in this case the rotatable propeller-type mixing element 17 is mounted to the lid 8 rather than to the base portion 3 of the cup 2. More specifically, the rotatable propeller-type mixing element 17 is mounted to the lid 8 via coupling means 19, which comprise a shaft that extends through a feedthrough 21 with sealing members 22 provided in the center at the top of the lid 8. In the depicted configuration the tubular outlet 13 with the external thread 14 for coupling to an external applicator device is disposed laterally on the conical wall portion 12, close to the top of the lid 8. The filter 15 may be provided at or within the outlet 13 for avoiding interference with the rotation mechanism.

Figure 5:
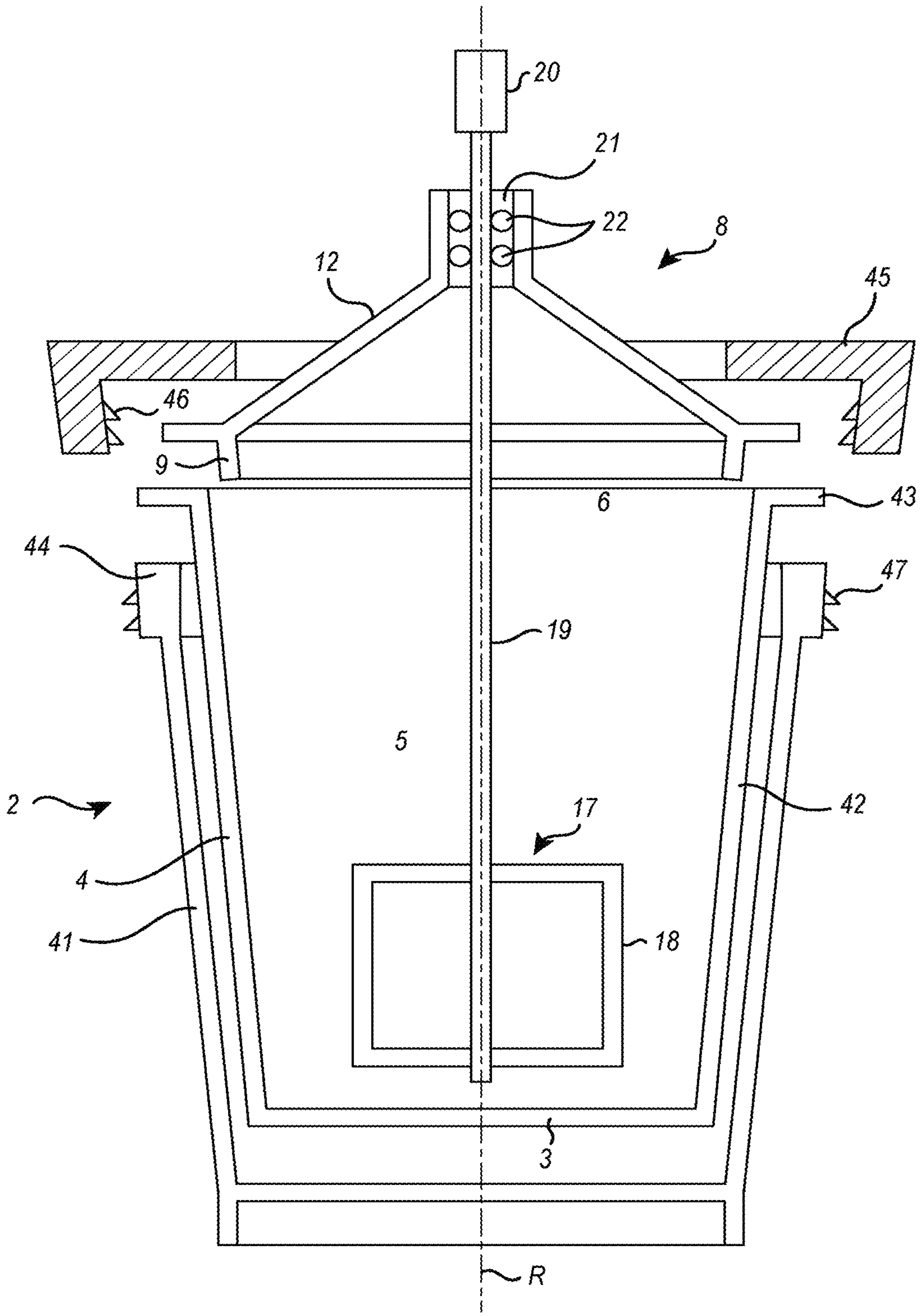
FIG. 5 represents a cross-sectional schematic view of another exemplary embodiment of a paint mixing container according to the present invention with a liner-support assembly.

FIG. 5 represents a cross-sectional schematic view of another exemplary embodiment of a paint mixing container 1 according to the present invention, wherein the rotatable propeller-type mixing element 17 is mounted to the lid 8 analogous to the embodiment of FIG. 4. However, in case of the embodiment shown in FIG. 5 the paint cup 2 comprises an outer support cup 41 and an interior liner 42. Both the support cup 41 and the liner 42 have a truncated conical shape, which is symmetric with respect to the depicted central rotation axis R, and have a flat circular base portion 3, and sidewall portions 4 extending therefrom to define an interior volume 5. The end opposite to the base portion is open. The liner 42 has slightly smaller dimensions than the support cup 41 such that it can be inserted into the support cup 41, forming a nested configuration. The liner 42 has a circumferential flange 43 at its open end 6, which rests on the upper rim 44 of the support cup 41 in the nested configuration. The lid 8 is has a shape and dimensions such that it fits on the liner 42 to close its opening 6. For example, the bottom end of the lid 8 can have a ring-shaped portion 9 having a basically L-shaped cross-section which rests on the flange 43 when the lid is installed on the liner 42. A leak-tight connection of the assembly of the lid 8, the liner 41 and the support cup 42 can be achieved by means of a sleeve nut-like connector 45, having a ring shape with a basically L-shaped cross-section, provided with an internal thread 46, which matches with an external thread 47 provided on the outside of the rim 44 of the support cup 41. By tightening the connector 45 via the thread connection on the support cup 41 a compressive force is exerted by which the ring-shaped portion 9 of the lid 8, the flange 9 of the liner 42 and the rim 44 of the support cup are pressed together to form a leak tight connection. In the embodiment according to FIG. 5 the interior volume of the liner 42 forms the receptacle volume 5 wherein the paint components to be mixed are received. The receptacle volume 5 can for example have a volume in the range of 100 mL to 1000 mL, such as about 300 mL, 600 mL or 900 mL. The rotatable mixing element 17 is disposed in the receptacle volume 5 being mounted to the lid 8 via coupling means 19, which comprise a shaft that extends through a feedthrough 21 with sealing members 22 provided in the center at the top of the lid 8. The rotatable mixing element depicted in FIG. 5 has mixing blades in a form of C-shaped brackets at the free end of the shaft. Various other configurations of the rotatable mixing element can though be used as described herein.

In case of a support-liner assembly as for example illustrated in FIG. 5 the liner 42 and lid 8 would typically be disposable, while the support cup 41 and the connector 45 can be used recurrently as they do not come into contact with the paint components. The liner 42 may in particular be made of a flexible material, for example an elastic plastic material, that allows for an adaptation when subjected to a pressure differential upon withdrawal of mixed paint from the container. The support cup 41 and the connector 45 as well as the lid are typically made on the contrary from a rigid material. The lid 8 can be configured to have an outlet 13 for the paint analogous to the embodiment shown in FIG. 4. Alternatively, the lid 8 with the mounted rotatable mixing means 17 can be replaced by another lid 8 having an outlet 13 for the paint after mixing of the paint components for subsequent use with an applicator device such as a spray gun.

The paint mixing containers 1 shown in FIGS. 4 and 5 may be used in an analogous manner as described above for FIG. 1 with the difference that the actuator then couples to the coupling means 19 from the top of the container 1.

As already mentioned above, the rotatable mixing element 17 used in the paint mixing containers according to the present invention such as those shown in FIGS. 1,2, 4 and 5 can have various different configurations. This includes all kinds of shapes and geometries that are common in the art for mixing or stirring paints.

Figure 6E:
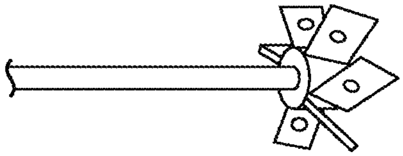
FIG. 6A-E illustrates various exemplary configurations of a rotatable mixing element that can be used in paint mixing container according to the present invention.
Figure 6D:
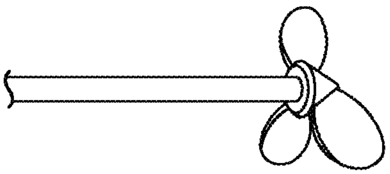
Figure 6C:
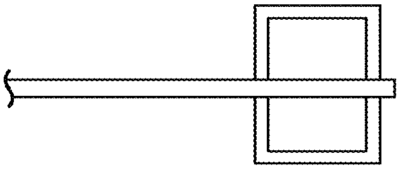
Figure 6B:
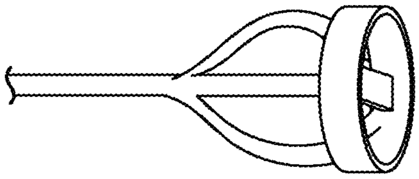
Figure 6A:
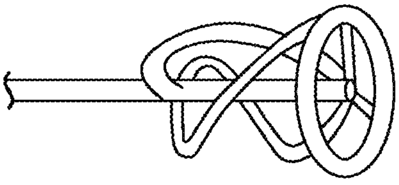

FIGS. 6A to 6E illustrate some non-limiting exemplary configurations of the rotatable mixing element that can be used according to the present invention. As shown in FIGS. 6A and 6B the rotatable mixing element 17 can for example have a disc or ring-shaped element at the free end of the rotatable shaft. Arcuate, tortuous or spiral-shaped members may extend from the shaft to the disc or ring-shaped element at the free end of the rotatable shaft, such as three tortuous members in case of FIG. 6A or two arcuate members in case of FIG. 6B. FIG. 6C illustrates another configuration, wherein the mixing element comprises a plurality (such as two) C-shaped brackets extending radially at the free end of the shaft to each enclose a rectangular opening. FIG. 6D illustrates further a propeller-type configuration, wherein three spoon-like mixing blades, which are inclined under an angle with respect to the rotation direction, extend radially from the rotation shaft and are arranged symmetrically thereto. The shape, arrangement and number of mixing blades in such configurations can be varied widely. For example, FIG. 6E illustrates another configuration, wherein a plurality (such as six) of in this case inclined rectangular mixing blades extend radially from the rotation shaft in a symmetric manner. As shown in FIGS. 6D and 6E the mixing blades can be solid or have one or more openings.

The paint mixing containers 1 as shown in FIGS. 1, 2 and 4 and 5 and the components thereof such as the cup 2, the lid 8, the rotatable mixing element 17 and the coupling means 19 can in particular be made from a plastic material, preferably a recyclable or biodegradable plastic material, such as any of the materials mentioned previously, for example by injection molding. The sealing member(s) 22 are typically made of an elastic abrasion resistant material such as rubber and can be incorporated in-situ during formation of the plastic body to which they shall be attached (i.e. the cup 2 or the lid 8) or be affixed after the plastic body has been formed. The illustrated exemplary paint mixing containers may in particular be disposable.

Although exemplary specific variants may have been described in the present disclosure above for illustrative purposes, it is to be understood that the present invention is to be construed over the entire scope of the appended claims including any variations thereof under the doctrine of equivalents.

The invention claimed is:

1. A container for mixing paint comprising:
- a paint cup comprising a base portion and sidewall portions enclosing a receptacle volume, and having an opening opposite to the base portion;
- a lid forming an outlet and being detachably connected to the paint cup to seal the opening of the paint cup when closed;
- a rotatable mixing element disposed in the receptacle volume; and
- a coupling means for operatively connecting the rotatable mixing element to an actuator configured to drive the rotatable mixing element, wherein:
- the lid further includes a ventilation mechanism comprising a tube extending from the lid into the receptacle volume, the lid having the tube extending therefrom to a length that is short of the rotatable mixing element when in an upright position;
- the ventilation mechanism is in a default closed position in the upright configuration in the upright configuration during fill and mixing of paint in the paint cup, and opens in the upside down configuration during withdrawal of paint from the paint cup, providing pressure equalization during withdrawal of the paint.

2. The container according to claim 1, wherein:
- the rotatable mixing element comprises a propeller with three or more mixing blades;
- the three or more mixing blades comprise scraping elements and
- the mixing blades are symmetrically arranged around an axis of rotation of the mixing element.

3. The container according to claim 1, wherein the paint cup has a rotation symmetrical shape comprising a cylindrical or a truncated conical shape.

4. The container according to claim 3, wherein:
- the rotatable mixing element is disposed with its center of gravity along: (i) a rotation symmetry axis of the paint cup, and/or (ii) in an orientation such that the rotatable mixing element rotates around an axis corresponding to or parallel to the rotation symmetry axis of the paint cup.

5. The container according to claim 1, wherein the coupling means is at one end connected to the rotatable mixing element and has a coupling portion at an opposite end, which faces outside of the paint cup and is shaped and configured to be engaged by a matching connecting part of the actuator.

6. The container according to claim 1, wherein:
- the outlet of the lid is coupled to a paint applicator device comprising a spray gun, and
- a filter is installed inside the lid.

7. The container according to claim 1, wherein:
- the rotatable mixing element is mounted alternately to: the base portion of the paint cup, or to the lid and
- the mounting operatively connects the rotatable mixing element to the actuator via the coupling means.

8. The container according to claim 7, wherein the base portion of the cup or the lid comprises a feedthrough as a mount for the coupling means.

9. The container according to claim 1, further comprising:
- a sealing member comprising a rubber gasket;
- wherein the sealing member provides for a leak tight operative connection of the rotatable mixing element to the actuator via the coupling means.

10. The container according to claim 1, further comprising a receptacle volume in a range from 0.1 L to 2.0 L.

11. The container according to claim 1, wherein the container is disposable.

12. The container according to claim 1, wherein the container is made of a plastic material.

13. The container of claim 1, further comprising a connector and wherein the paint cup comprises a liner and support cup, the liner configured to be inserted into the support cup and the connector configured to form a leak tight connection with the support cup, liner, and lid.

14. A paint mixing apparatus comprising:
- one or more ports configured to accommodate a paint mixing container according to claim 1; and
- the actuator is configured to drive the rotatable mixing element.

15. The paint mixing apparatus according to claim 14, wherein:
- the actuator comprises an electrical or pneumatic drive; and/or
- at least one port comprises means to retain the container during the mixing operation.

16. The paint mixing apparatus according to claim 14, wherein the actuator comprises a connecting part arranged at the portion of the port facing the base portion or the opposite opening of the paint cup, respectively, and configured to releasably engage the coupling means.

17. A process for mixing paint comprising:
- providing a container according to claim 1,
- introducing one or more paint components to be mixed into the paint cup in desired amounts,
- closing the opening of the paint cup with the lid, and
- mixing the one or more paint components by driving the rotatable mixing element by operation of the actuator.

18. A container for mixing paint comprising:

a paint cup comprising a base portion and sidewall portions enclosing a receptacle volume, and having an opening opposite to the base portion;

a lid forming an outlet and being detachably connected to the paint cup to seal the opening of the paint cup when closed;

a rotatable mixing element disposed in the receptacle volume, wherein the rotatable mixing element comprises mixing blades that extend from a rotation axis of the rotatable mixing element and dimensioned to almost reach, but not contact, the base and sidewall portions, such that the distance between the mixing blades and the base and sidewall portions is below 1 mm;

a coupling means for operatively connecting the rotatable mixing element to an actuator configured to drive the rotatable mixing element; and ventilation means provided in the lid of the paint cup, the ventilation means comprising a hollow tube connected to a ventilation valve of the ventilation means, wherein:

the hollow tube has a position and length such that the hollow tube does not interfere with the rotatable mixing element disposed in the receptacle volume in an upright configuration of the paint cup, and in an upside down configuration of the paint cup, the ventilation means provides an efficient pressure equilibration without risk of paint leakage during use of the paint cup.

* * * * *